United States Patent
Fernandez et al.

(10) Patent No.: US 10,771,938 B2
(45) Date of Patent: Sep. 8, 2020

(54) VEHICLE COMMUNICATION DEVICE HAVING A PLURALITY OF COMMUNICATION MEANS

(71) Applicant: PSA AUTOMOBILES S.A., Poissy (FR)

(72) Inventors: Antonio Eduardo Fernandez, Vigo (ES); Alexandre Fromion, Antony (FR); El Khamis Kadiri, Neauphle le Chateau (FR)

(73) Assignee: PSA Automobiles S.A., Poissy (FR)

( * ) Notice: Subject to any disclaimer, the term of this patent is extended or adjusted under 35 U.S.C. 154(b) by 0 days.

(21) Appl. No.: 16/156,247

(22) Filed: Oct. 10, 2018

(65) Prior Publication Data

US 2019/0132718 A1 May 2, 2019

(30) Foreign Application Priority Data

Oct. 27, 2017 (FR) .................... 17 60187

(51) Int. Cl.
| | |
|---|---|
| *H04W 4/44* | (2018.01) |
| *H04W 48/18* | (2009.01) |
| *H04W 4/48* | (2018.01) |
| *H04W 4/50* | (2018.01) |
| *H04W 4/40* | (2018.01) |
| *H04W 4/20* | (2018.01) |
| *H04W 88/06* | (2009.01) |
| *H04W 8/24* | (2009.01) |

(52) U.S. Cl.
CPC .............. *H04W 4/44* (2018.02); *H04W 4/20* (2013.01); *H04W 4/40* (2018.02); *H04W 4/48* (2018.02); *H04W 4/50* (2018.02); *H04W 48/18* (2013.01); *H04W 8/245* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2011/0095905 A1 | 4/2011 | Mase | |
| 2011/0320089 A1* | 12/2011 | Lewis | G01C 21/32 701/29.6 |
| 2014/0164582 A1* | 6/2014 | Dawson | H04W 48/18 709/221 |
| 2015/0099469 A1* | 4/2015 | Goldstein | H04L 67/24 455/41.2 |
| 2015/0245109 A1* | 8/2015 | Couleaud | H04N 21/43637 725/77 |

FOREIGN PATENT DOCUMENTS

JP 3674602 B2 * 7/2005

\* cited by examiner

*Primary Examiner* — Mohammed Rachedine
(74) *Attorney, Agent, or Firm* — Sandberg Phoenix & von Gontard P.C.

(57) ABSTRACT

A communication device for a vehicle comprises a plurality of communication means and a rule base. The communication device is designed to determine a communication means to use using said rule base. The communication device is further designed to:
  check with a remote server as to whether an update of the rule base is available,
  download the rule base update, and
  update the rule base using the downloaded rule base.

7 Claims, 3 Drawing Sheets

VEHICLE COMMUNICATION DEVICE HAVING A PLURALITY OF COMMUNICATION MEANS

CROSS-REFERENCE TO RELATED APPLICATIONS

This Application claims priority to French App. No. 1760187 filed Oct. 27, 2017 and which is incorporated herein by reference.

BACKGROUND

The invention relates to the transmission of data between a vehicle and a remote server, and in particular the determination of communication means that allow for transmission of this kind.

It is known to transmit data between a vehicle and a remote server via a wireless communication means.

For example, it is known to use a Wi-Fi access point in order to transfer data from a vehicle to a server. However, this connection means is not always available.

It is also known to use a 3G or 4G connection in order to transfer data from a vehicle to a server. However, this connection means may become expensive because it is generally billed on the basis of the volume of data transferred.

US20110095905 discloses a method that makes it possible to select a communication means on the basis of various criteria, such as the priority of the data to be transmitted, or even the cost of the communication.

However, a solution of this kind does not make it possible to adapt to one-off changes in the surroundings of the vehicle, for example network coverage problems resulting from a temporary outage.

SUMMARY

Briefly, a communication method and device are provided for a vehicle which can be adapted on the basis of the surroundings of the vehicle.

More specifically, a communication device is provided for a vehicle, wherein the device comprises a plurality of communication means and a rule base. The communication device is designed to determine a communication means using the rule base. The communication device is further designed to:
  check with a remote server as to whether an update of the rule base is available,
  download the rule base update,
  update the rule base using the downloaded rule base.

This makes it possible to have a regularly updated rule base. The choice of a communication means can thus take account of changes in the surroundings of the vehicle.

Further, the communication device for a vehicle according to the invention is advantageously designed such that, following data communication, it:
  saves data relating to the communication,
  transmits the data to the remote server.

This feature allows the vehicle to send the server information relating to the surroundings of the vehicle and relating to the effective operation of the available communication means.

The data transmitted to the remote server advantageously comprise at least one of the following items of data: the communication means used for the communication, a bandwidth, a latency, an error rate, geolocation data indicating the position of the vehicle at the time of transmission, a size of the file or files transmitted.

The communication device for a vehicle advantageously comprises at least one of the following communication means: Wi-Fi, 2G, 3G, 4G, 5G cellular network, 802.11p satellite link, or others.

The communication device for a vehicle is advantageously designed to update the rule base when the vehicle starts up.

This feature makes it possible to have a rule base that is up-to-date each time the vehicle is used.

The data to be transmitted advantageously comprise a security message intended for an infrastructure or for another vehicle.

A communication method for a vehicle comprising a plurality of communication means and a rule base is also disclosed. The method comprises a step of determining a communication means using the rule base, wherein, the method is further designed to:
  check with a remote server as to whether an update of the rule base is available,
  download the rule base update,
  update the rule base using the downloaded rule base.

Further, the communication method for a vehicle advantageously comprises the steps of:
  establishing communication with a selected communication means,
  saving data relating to the communication,
  transmitting the data to the remote server.

A vehicle comprising the communication device is also disclosed.

A communication system is disclosed which comprises a remote server. The communication system further comprises at least one first and one second vehicle that are capable of communicating with the remote server.

The communication system is based on an offboard system, i.e., the remote server, which stores each instance of communication towards the outside of the vehicle and geolocates the communication. This database makes it possible to define routing rules on the basis of the logged history and other parameters to be defined.

The onboard portion of the system picks up each instance of communication made in order to store the instance of communication, and downloads the geolocated routing rules at a particular frequency.

The onboard intelligence (in other words the rule base) is based on an offboard system, i.e., the remote server, which saves the events implemented in order to define the management rules that are taken into account and applied in the onboard part.

BRIEF DESCRIPTION OF THE FIGURES

Other features and advantages of the invention will become apparent from the detailed description below and the accompanying drawings, in which.

The accompanying drawings are able not only to complete the invention, but also to contribute to the definition thereof, if applicable.

DETAILED DESCRIPTION

Figure 1:
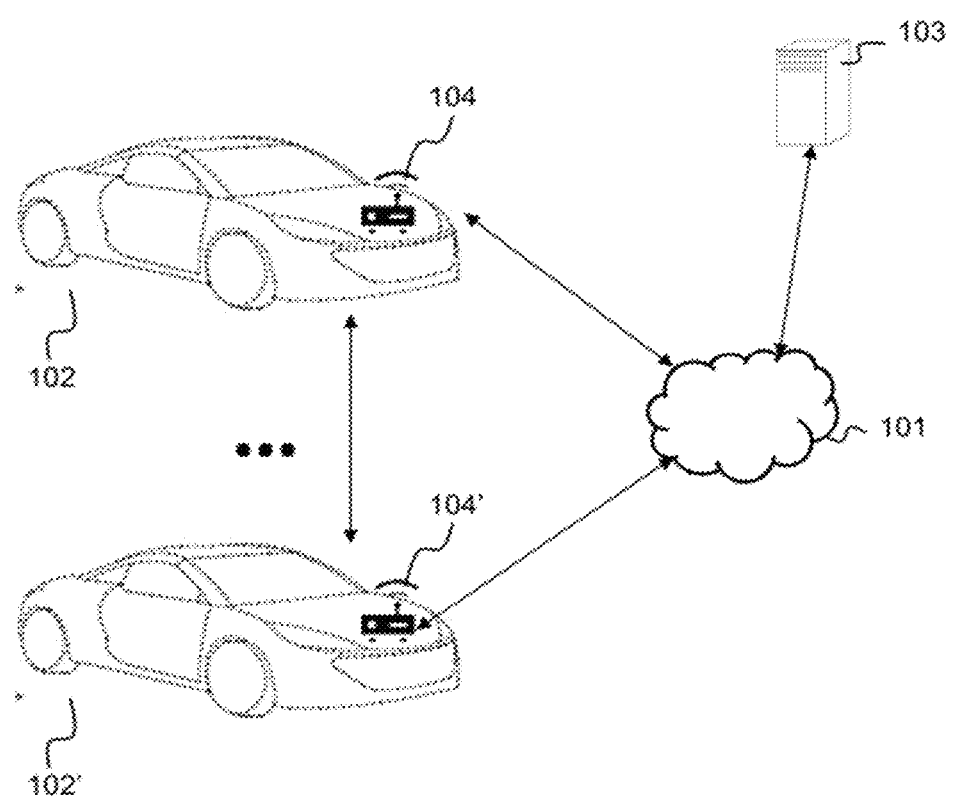
FIG. 1 shows a communication system.

FIG. 1 shows an embodiment of a communication system.

The communication system comprises at least one first vehicle 102 and a remote server 103 that communicates via a wide area network.

The vehicle 102 comprises at least one trip computer (not shown), for example a computer, which comprises at least one processor and a memory, and which manages some of the electrical equipment of a vehicle and in particular the airbags, the interior lighting, locking/unlocking of the doors and the trunk, the operation of electrically opening windows and roof, the pace of the windshield wipers, the time-lags, and the alarm (if applicable). The computer also manages the dialogue between the immobilizer and the engine computer. The vehicle 102 also comprises a data bus (not shown), for example a CAN (Controller Area Network) type bus, on which a plurality of computers communicates in turn by exchanging communication frames.

Each frame is identified by a code and contains a set of functional information. For example, the vehicle 102 comprises a computer for detecting underinflation, which computer outputs frames providing the state of each wheel (ok, deflated, punctured, etc.). This information is used by other units of the vehicle and can, in particular, be retrieved by a computer 104.

The vehicle 102 also comprises a telematics computer 104 (also referred to as the communication device 104) comprising means for communicating with equipment outside the vehicle. The computer 104 comprises a communication module. The computer further comprises a plurality of communication means that make it possible to send and receive data to and from the server 103. By way of non-limiting example, the communication means can include Wi-Fi, 2G, 3G, 4G, 5G LTE cellular network, 802.11p satellite link, or others.

According to one feature, the communication device 104 also comprises a rule base. The communication device is designed to determine the communication means using the rule base.

The communication device is also designed to:
check with the server 103 as to whether an update of the rule base is available,
download the rule base update, if applicable,
update the rule base using the downloaded rule base.

This feature makes it possible to easily and regularly modify the manner in which the rules are selected. This makes it possible, for example, to modify the rules in order to take account of one-off events on a communications network.

The central server 103 is shared by a plurality of vehicles. The server comprises a database for storing the data originating from terminals. In practice, the server stores a certain amount of information relating to the vehicle (for example the VIN—Vehicle Identification Number) and to the owner thereof.

The server is designed to update the rule base using data originating from the vehicles 102, 102'.

The vehicle 102 and the offboard server 103 communicate via a wide area network (WAN) such as a fixed communication network 101, for example the Internet, to which the vehicle connects via a wireless link (3G, 4G, etc.).

Figure 2:
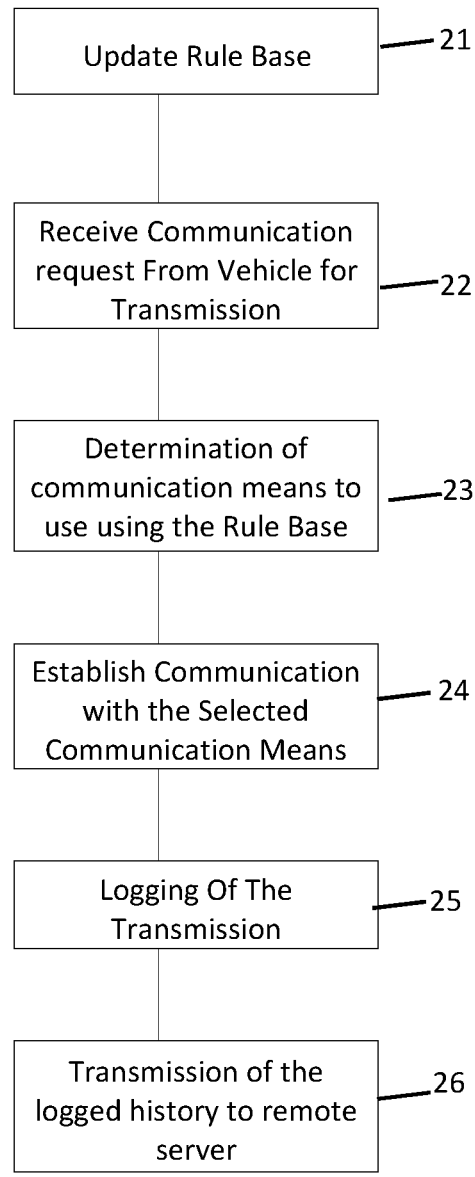
FIG. 2 is a logic diagram showing a communication method.

FIG. 2 is a logic diagram showing the communication method. The method comprises a step 21 of updating the rule base.

The method comprises a step 22 of receiving a communication request, in other words a data frame that originates from a computer of the vehicle 102 and is intended to be transmitted to outside the vehicle 102.

The method then comprises a step 23 of determining a communication means to use using the rule base. The device transmits data contained in the frame (for example the data type to be transmitted) to the selection module.

The determination of a communication means to use advantageously takes into account at least one of the following parameters: a communication type, price of the communication, time period, criticality of the transmission, an item of geolocation data, etc.

The criticality of the transmission indicates the urgency and/or the need to rapidly implement the requested transmission. The criticality of the transmission depends mainly on the type of message to be transmitted. For example, transmitting a very critical message (referred to as ITS DENM, for Intelligent Transport System Decentralized Environmental Notification Message) involves using the most rapid communication means, irrespective of other constraints, for example LTE-V (or 5G) when available, and if this is not available, using the mobile network (for example 3G).

The selection of the communication means advantageously also takes account of the geolocation of the vehicle.

For example, when the vehicle detects the need associated with a use, before deciding on the communication means to prioritize, the device uses the rules already available locally to the vehicle, i.e., for updating the cartography, the size and the criticality mean that attempts will be made using Wi-Fi or satellite in order not to have too much impact on the cost of the communication. However, in the case of a security update, the rule base prioritizes speed (in terms of bandwidth) without taking the cost into account.

The method then comprises a step 24 of establishing communication with the selected communication means, and outputting data via the selected communication means.

The method advantageously further comprises a step 25 of logging the transmission. In other words, data relating to the transmission are saved in a memory of the device.

The method further comprises a step 26 of outputting transmission data to the remote server 103.

The transmitted data advantageously comprise at least one of the following items of data:
the communication technology used, i.e., 2G, 3G, 4G, 5G LTE, satellite, Wi-Fi, etc.
a bandwidth that indicates the maximum bit rate of the transmission channel (it is noted that the bit rate is a quantity of digital data transmitted per unit of time, expressed for example in kB/s, for kilobits per second, or Mb/s, for megabits per second),
a latency, indicating a time period between the moment at which an item of information is sent and the moment at which it is received,
an error rate, indicating for example the error rate measured when a digital transmission is received, and/or a level of disturbance of the transmitted signal,
geolocation data, indicating the position of the vehicle at the time of the transmission,
a size of the file (or files) transmitted.

Figure 3:
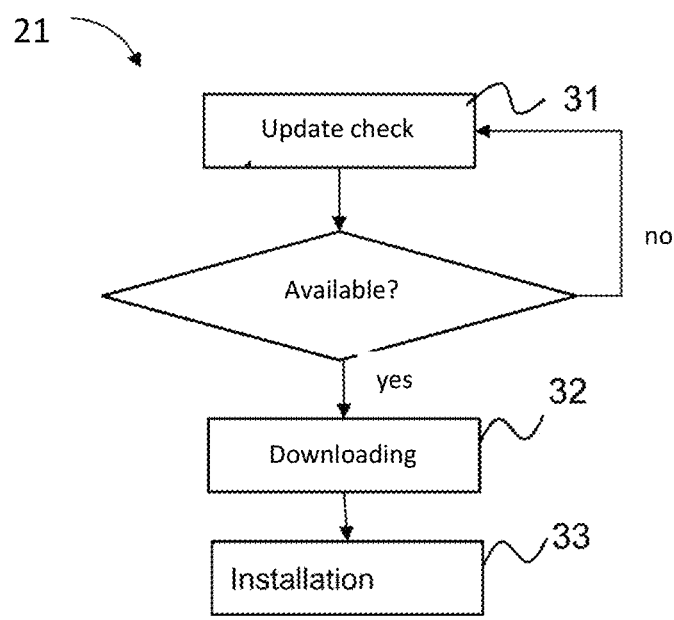
FIG. 3 is a logic diagram showing sub-steps of the method.

A first step 21, as shown in FIG. 3, comprises a step 31 of checking with a remote server 103 as to whether an update is available. This check is made, for example, by retrieving and comparing version dates of the rule base of the communication device 102 and of the rule base of the remote server 103.

This step of comparing the version dates makes it possible to identify whether the onboard rule base is older than the rule base of the remote server 103. Other methods are possible, for example comparing the version number.

This step can be carried out regularly, at a pre-defined frequency, for example every week or fortnight, or in response to an event, for example each time the vehicle starts up or stops.

If an update is available, the device then at step 32 downloads the update file(s) into a backup storage, for example of the eMMC type, or a chip comprising a flash memory. However, this could also be a mechanical backup storage means, such as a hard disk.

The following step 33 comprises installing the downloaded rule base in the decision module of the communication device. During installation, the new rules replace the old rules in the database.

The device is then ready to operate using the new rules.

The invention claimed is:

1. A communication device for a vehicle adapted to communicate with a remote server using one of a plurality of communication means; said communication device being on-board the vehicle and comprising a rule base to select a communication means to transmit data from the plurality of communication means; said communication device being adapted to determine a communication means of the plurality of communication means to use using said rule base; said determination being made as a function of on one or more of the following: a criticality of the data to be transmitted, price of communication, time period at which the data is to be transmitted, and a location of the vehicle at the time of transmission of data, wherein, the communication device is further designed to:
 check with said remote server when the vehicle starts up as to whether an update of the rule base is available,
 download the rule base update, and
 update the rule base using the downloaded rule base;
 after transmission of a data frame; save data related to the communication, the data related to the communication comprising one or more of the following: the communication means used for the communication, a bandwidth, a latency, an error rate, geolocation data indicating the position of the vehicle at the time of transmission, and a size of the file or files transmitted; and
 transmit the data related to the communication to the remote server for use by the remote server for updating the rule base.

2. The communication device according to claim 1, wherein the communication means comprises at least one of the following: Wi-Fi, 2G, 3G, 4G, 5G LTE cellular network or satellite link.

3. The communication device according to claim 1, wherein the communication device is adapted to transmit data comprising a security message intended for an infrastructure or for another vehicle.

4. A vehicle comprising the communication device according to claim 1.

5. A communication method for a vehicle comprising one or more computers which control functions of the vehicle and a telematics computer comprising a memory and a communication device adapted to transmit data by way of a plurality of communication means for transmitting data; said telematics computer storing a rule base for selecting a communication means from among the plurality of communication means, the method comprising the steps of:
 the telematics computer checking with a remote server as to whether an update of the rule base is available upon startup of the vehicle and downloading the update of the rule base if an update is available;
 the telematics computer receiving a communication request to transmit a data frame comprising functional information related to the vehicle;
 the telematics computer determining a communication means to select using said rule base; said determination being based on one or more of the following: a criticality of the data to be transmitted, price of communication, time period at which the data is to be transmitted, and a location of the vehicle at the time of transmission of data;
 the telematics computer establishing communication with the selected communication means and transmitting said data frame;
 the telematics computer saving data relating to the communication, the data related to the communication comprising one or more of the following: the communication means used for the communication, a bandwidth, a latency, an error rate, geolocation data indicating the position of the vehicle at the time of transmission, a size of the file or files transmitted; and
 the telematics computer transmitting said data relating to the communication to said remote server.

6. The communication method of claim 5 further comprising:
 checking with the remote server as to whether an update of the rule base is available,
 downloading of the rule base update, and
 updating the rule base stored on a computer of the vehicle using the downloaded rule base.

7. A communication system comprising a remote server and at least one vehicle; said remote server storing a communication rule base, and said at least one vehicle comprising one or more computers which control functions of the at least one vehicle and a telematics computer adapted to communicate with said remote server and comprising a memory and a communication device adapted to transmit data by way of a plurality of communication means for transmitting data; said telematics computer storing a rule base for selecting a communication means from among the plurality of communication means, wherein said telematics computer is adapted to:
 upon startup of the at least one vehicle, check with the remote server as to whether an update of the rule base is available and download the updated rule base if an update is available;
 receive a communication request from the one or more computers to transmit a data frame comprising functional information related to the vehicle;
 determine a communication means to use to transmit said data frame using said rule base; said determination being based on one or more of the following: a criticality of the data to be transmitted, price of communication, time period at which the data is to be transmitted, and a location of the vehicle at the time of transmission of data;
 establish communication with the remote server using the selected communication means and transmit said data frame;
 save data relating to the communication, the data related to the communication comprising one or more of the following: the communication means used for the communication, a bandwidth, a latency, an error rate, geolocation data indicating the position of the vehicle at the time of transmission, a size of the file or files transmitted; and transmit said data relating to the communication to said remote server;

wherein the remote server is adapted to update the rule base stored on the server using the data relating to the communication transmitted from the at least one vehicle.

\* \* \* \* \*